(12) United States Patent
Sutter (10) Patent No.: US 7,622,675 B2
(45) Date of Patent: Nov. 24, 2009

(54) PAINT SHIELD

(75) Inventor: Robert W. Sutter, DeKalb, IL (US)

(73) Assignee: IDEAL Industries, Inc., Sycamore, IL (US)

( * ) Notice: Subject to any disclaimer, the term of this patent is extended or adjusted under 35 U.S.C. 154(b) by 0 days.

(21) Appl. No.: 11/690,170

(22) Filed: Mar. 23, 2007

(65) Prior Publication Data

US 2008/0245546 A1    Oct. 9, 2008

(51) Int. Cl.
*H02G 3/14* (2006.01)
*H05K 5/03* (2006.01)

(52) U.S. Cl. .......................... 174/66; 174/67; 220/241; 220/242

(58) Field of Classification Search ................ 174/66, 174/67, 50, 53, 58, 57, 54; 220/3.2–3.9, 220/4.02, 241, 242; 33/DIG. 10, 528, 562; 16/DIG. 2; 118/505, 504, 506; D13/154, D13/156; 200/333; D8/352
See application file for complete search history.

(56) References Cited

U.S. PATENT DOCUMENTS

| | | | |
|---|---|---|---|
| D76,275 S | 9/1928 | Wilms | |
| 2,398,901 A | 4/1946 | West | |
| 2,666,546 A | 1/1954 | Reilly | |
| D185,531 S | 6/1959 | Carlson | |
| 2,925,064 A | 2/1960 | Kahn | |
| 3,061,083 A | 10/1962 | Hubbell, Jr. | |
| 3,386,071 A | 5/1968 | Allen | |
| 4,293,173 A | 10/1981 | Tricca | |
| D279,860 S | 7/1985 | Schwalbe | |
| D297,396 S | 8/1988 | Schwalbe | |
| 4,822,650 A | 4/1989 | Horiki et al. | |
| 5,003,128 A | 3/1991 | Grondin | |
| 5,063,872 A | 11/1991 | Maus et al. | |
| 5,285,014 A | 2/1994 | Gilchrist | |
| D346,361 S | 4/1994 | Richey et al. | |
| D349,836 S | 8/1994 | Maggard | |
| D351,376 S | 10/1994 | Hughes | |
| 5,375,728 A | 12/1994 | West | |
| 5,432,298 A * | 7/1995 | Thompson | .................... 174/67 |
| D360,876 S | 8/1995 | Hughes | |
| D360,878 S | 8/1995 | Dyer et al. | |
| D362,602 S | 9/1995 | Kusler | |
| 5,525,755 A | 6/1996 | Christensen | |
| 5,526,952 A | 6/1996 | Green | |
| 5,723,816 A | 3/1998 | Neece | |
| 5,955,702 A | 9/1999 | Grossman et al. | |
| D425,768 S | 5/2000 | Staley | |
| 6,103,974 A | 8/2000 | Erdfarb | |
| D450,663 S | 11/2001 | Smith | |
| 6,317,995 B1 | 11/2001 | Hoffmann, Sr. | |
| D466,870 S | 12/2002 | Elliott | |
| 6,538,202 B1 | 3/2003 | Shaffer et al. | |

(Continued)

*Primary Examiner*—Angel R Estrada
(74) *Attorney, Agent, or Firm*—Cook Alex Ltd.

(57) ABSTRACT

A paint shield for covering an electrical device has a generally planar plate with an attachment element connected thereto. The attachment element releasably engages one or more of a standard wall switch, a decor type switch or a socket. At least one overspray wall on the rear face of the plate is spaced from the perimeter of the plate and extends from the plate to provide protection from paint or other surface treatments. The overspray wall may also serve as an attachment element. Blisters at or near the edges of the plate define receptacle for receiving a mounting screw head.

14 Claims, 7 Drawing Sheets

U.S. PATENT DOCUMENTS

| | | |
|---|---|---|
| 6,545,218 B1 | 4/2003 | Blaess |
| 6,627,816 B1 | 9/2003 | Walker et al. |
| 6,653,566 B2 | 11/2003 | Petak et al. |
| 6,664,471 B1 | 12/2003 | Howe, Jr. |
| 6,686,540 B2 * | 2/2004 | Compagnone, Jr. ........... 174/58 |
| 6,703,562 B1 | 3/2004 | Pacheco |
| 6,803,522 B2 | 10/2004 | Skakun |
| 6,867,370 B2 * | 3/2005 | Compagnone, Jr. ........... 174/58 |
| 6,906,260 B2 * | 6/2005 | Grendahl ...................... 174/66 |
| 6,927,341 B1 * | 8/2005 | Crane ........................... 174/66 |
| 6,949,708 B1 * | 9/2005 | Hausen et al. ................. 174/66 |
| 7,022,915 B1 * | 4/2006 | Galguera ...................... 174/66 |
| 7,071,413 B1 * | 7/2006 | Paape .......................... 174/66 |
| 7,186,917 B1 * | 3/2007 | Van De Wiele, Jr. .......... 174/66 |
| 2005/0269123 A1 * | 12/2005 | Diegel |
| 2007/0029177 A1 * | 2/2007 | Sprague |

* cited by examiner

PAINT SHIELD

BACKGROUND OF THE INVENTION

This invention relates to covers or shields used to protect electrical devices during painting or other similar surface finishing treatments such as plastering or spackling. Electrical devices such as switches and outlets typically are mounted in a junction box which is fastened to the studs of a wall or other surface. An appropriately-sized hole in the wall exposes the interior of the junction box. A decorative cover plate normally surrounds the device and covers the junction box and any gap between it and the wall to create an attractive, finished appearance. The decorative cover plate itself has openings that closely fit around the operative portions of the device, such as a lever for operating a switch or one or more sockets for receiving a plug. Since the decorative cover plate normally overlies a portion of the wall which needs finishing, and since it is sometimes desired not to paint the cover plate, careful painters usually remove the decorative cover plate prior to painting or finishing a surface. This leaves the electrical device fully exposed to damage or defacement caused by poorly aimed brush or roller strokes, paint spray, plastering or spackling.

It is well known to apply a temporary paint shield to the electrical device to protect it from misdirected paint and the like. U.S. Pat. Nos. 5,063,872, 6,538,202 and 6,703,562 disclose examples of such devices. However, the prior art paint shields of which applicant is aware suffer from various drawbacks which might be characterized generally as a lack of versatility. Some shields work with electrical outlets but not switches, or vice versa. Others will work with a standard wall type switch, with its lever in the form of the familiar toggle, but will not work with a so-called decor type switch, which has a lever in the form of a relatively wide rocker. It is inconvenient, almost to the point of defeating the purpose, if a painter has to have a specialized shield for every type of device. Another problem with some prior art paint shields is they cannot be used where there are multiple electrical devices in a ganged configuration. That is, it is common to have switches arrayed two or more in a row, or perhaps in multiple rows of two or more, often in a single enlarged junction box. Prior art shields cannot deal with this because they have walls or other elements that interfere with an adjacent device or its shield.

In addition to these versatility issues, other prior art paint shields simply perform poorly in their basic function. Some have mounting arrangements that space the shield panels so far from the wall that runs, drips, splashes and poorly aimed strokes can penetrate behind the shield and damage the device. Yet another problem with prior art shields is the mounting arrangements are inadequate and the shields pop off the device with the slightest provocation. This is worse than having no paint shield at all because it lulls the painter into a false sense of security. The painter thinks caution can be thrown to the wind only to find to his or her dismay that the shield will not withstand bumps or incidental contact with a roller or brush.

SUMMARY OF THE INVENTION

The present invention is a paint shield for temporary mounting on an electrical device during painting or other wall finishing operations. A primary object of the invention is a paint shield which can be used on a variety of electrical devices, including standard wall type switches, wide, rocker switches sometimes known as decor type switches and outlets.

Another object of the invention is a paint shield which has a generally planar plate with overspray walls spaced from the perimeter of the plate so adjacent plates can overlap one another without interfering with each other or the devices.

A further object of the invention is a paint shield having a planar plate with blisters on the top and bottom edges for accommodating screw heads.

Still another object of the invention is a paint shield that releasably engages the frame surrounding the toggle of a standard wall switch or the rocker of a decor type switch.

Yet another object of the invention is a paint shield with increased holding ability that can withstand the rigors of long-term usage and exposure to dislodging forces.

These and other desired benefits of the invention, including combinations of features thereof, will become apparent from the following description. It will be understood, however, that a structure could still appropriate the claimed invention without accomplishing each and every one of these desired benefits, including those gleaned from the following description. The appended claims, not these desired benefits, define the subject matter of the invention.

The paint shield has a generally planar plate having a front surface, a rear surface and a perimeter. One or more attachment elements are connected to the plate. The attachment elements can have various forms. In one embodiment the walls of a dome surround a central opening in the plate. The dome engages the frame around a toggle of a standard wall switch. A second embodiment uses attachment elements in the form of spaced apart overspray walls that engage either the frame around a rocker of a decor type switch or the socket housings of an outlet. In a further embodiment the attachment elements are a pair of pins that engage the screw holes in the device's mounting bracket. In yet another embodiment the attachment elements are a pair of blades that fit into the slots of an outlet in the nature of a electrical plug. Various combinations of the alternate attachment elements are possible.

Overspray walls may be disposed on the rear face of the plate. The walls extend normal to the plate. They are inwardly spaced from the perimeter so that the edges of the plate can overlap with an adjacent shield without the overspray walls getting in the way. The overspray walls surround the device to protect it from paint and the like.

The top and bottom edges of the plate may have blisters that are convex outwardly. The blisters define screw head receiving receptacles that accommodate the screws that attach a standard switch to the box.

DETAILED DESCRIPTION OF THE INVENTION

A first embodiment of the paint shield of the present invention is shown at 10 in FIGS. 1-5. This may be considered a universal paint shield because it can be used on standard wall switches, decor-type switches, and outlets. Shield 10 has a generally planar plate 12 which defines a front face 14, a rear face 16 and a perimeter 18. First and second blisters 20, 22 are formed in the plate at the top and bottom edges. The blisters are relatively small upraised portions that are convex on the front face 14 and concave on the rear face 16. The blisters define screw head receiving receptacles that accommodate the heads of the screws that mount the standard switches to the electrical box. The blisters prevent interference of the plate with these screws while preventing the screws from being damaged by paint or the like.

Figures 1, 5:
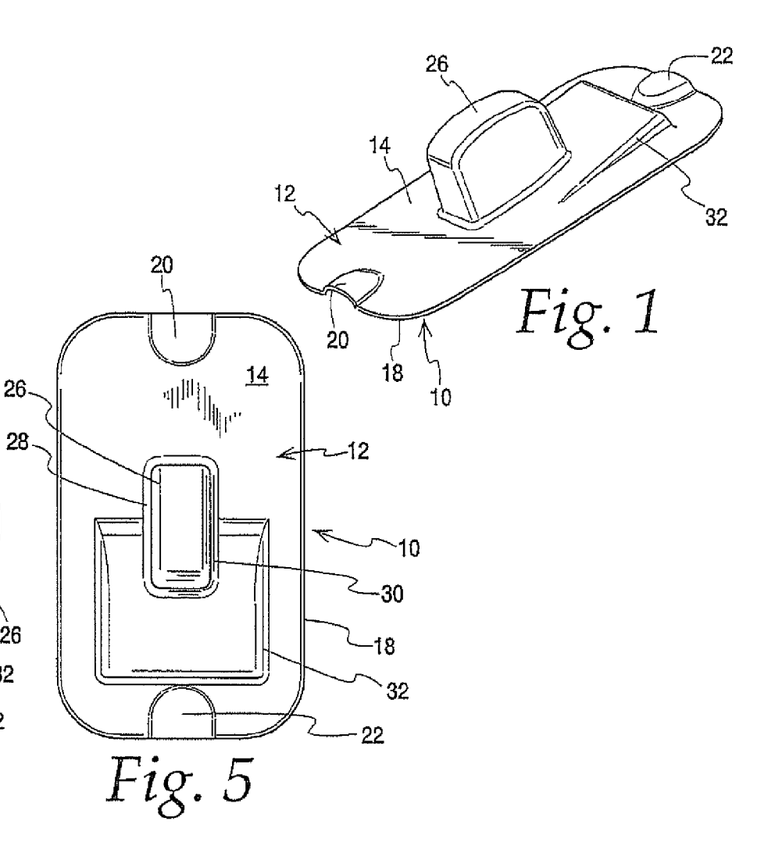
FIG. 1 is a perspective view of a paint shield according to the present invention in the form of a universal cover.
FIG. 5 is a front elevation view of the universal paint shield.
Figure 2:
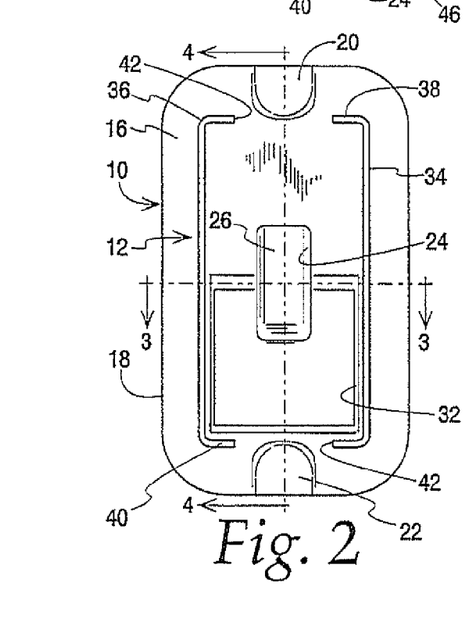
FIG. 2 is a rear elevation view of the universal cover of FIG. 1.
Figure 3:
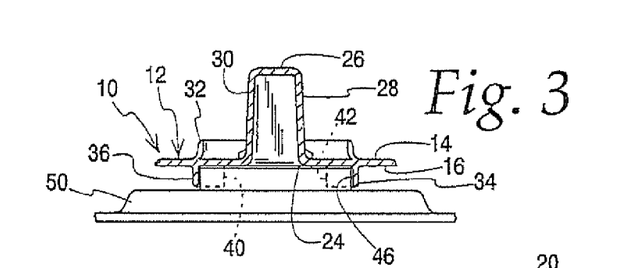
FIG. 3 is a section taken along line 3-3 of FIG. 2, showing the paint shield attached to an outlet.
Figure 4:
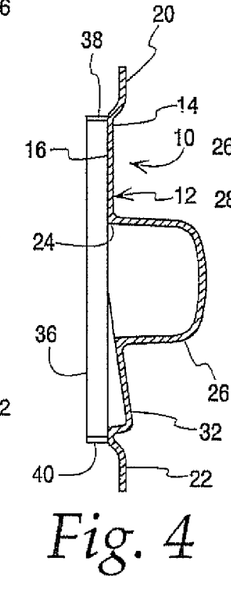
FIG. 4 is a section take along line 4-4 of FIG. 2.
Figure 6:
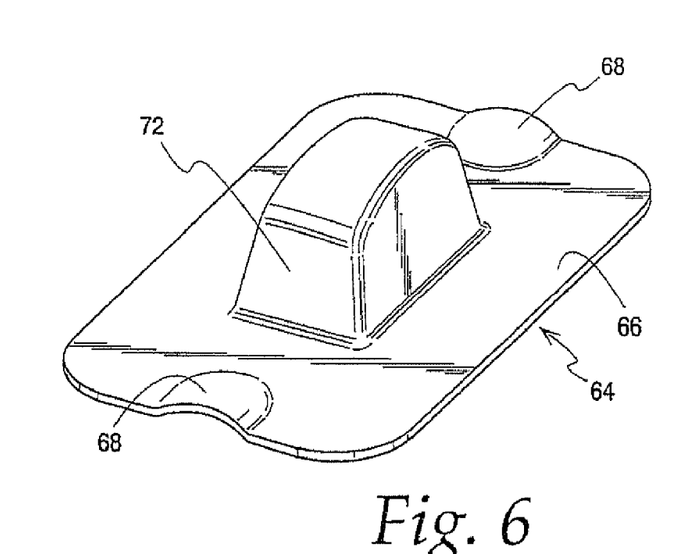
FIG. 6 is a perspective view of an alternate embodiment of a paint shield, in the form of a switch cover.
Figure 7:
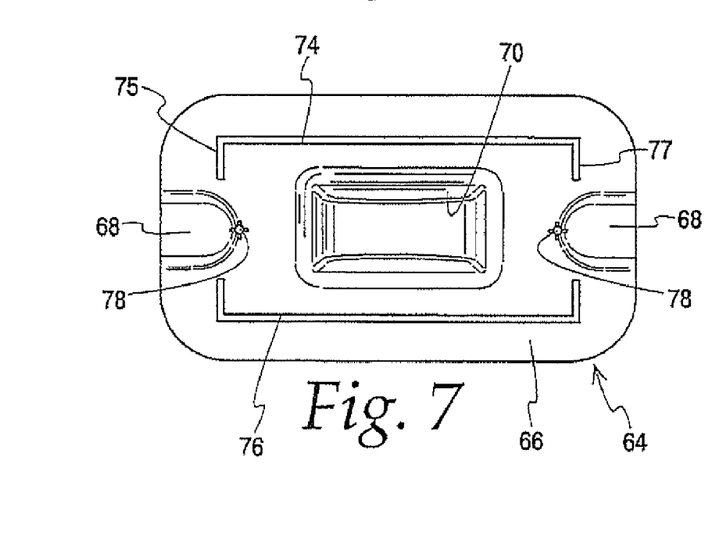
FIG. 7 is a rear elevation view of the switch cover of FIG. 6.
Figure 8:
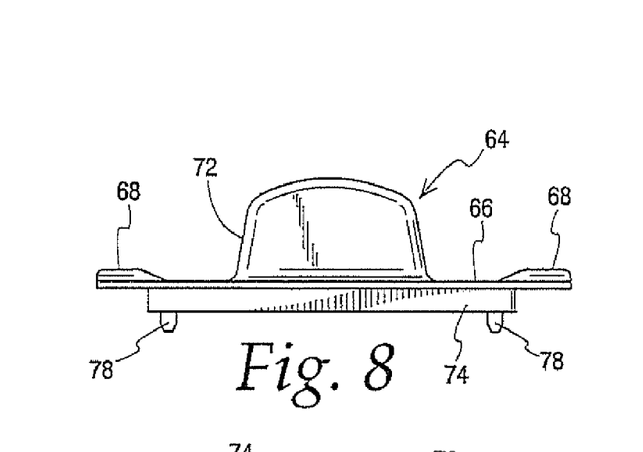
FIG. 8 is a side elevation view of the switch cover.
Figure 9:
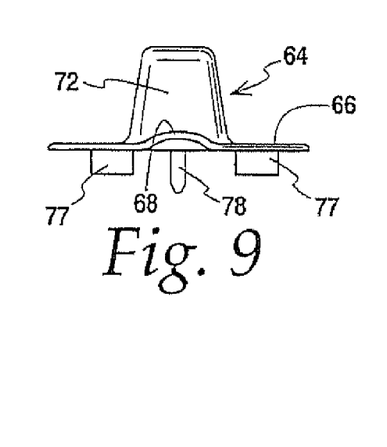
FIG. 9 is an end elevation view of the switch cover.

As seen in FIGS. 2-4 there is a central opening 24 at the center of the plate 12. The opening is surrounded on the front face by a dome 26. The dome has side walls 28 and 30. The side walls are spaced from one another at the opening 24 so as to be releasably engageable with the frame that surrounds the toggle of a standard wall switch. This will be explained in detail below. The dome merges on its lower half with an upraised well 32. As with the blisters, the well 32 is convex on the front face 14 and concave on the rear face 16. The well defines a rocker receiving chamber that accommodates the rocker of a decor type switch. The rocker is arranged so that half of it is generally parallel to the wall and half of it extends out of the plane of the wall at an angle. The extending half of the rocker is received in the well. Obviously the paint shield 10 is rotated so the well is on either the top or bottom half of the switch, depending on which half of the rocker is extending from the wall.

Figure 20:
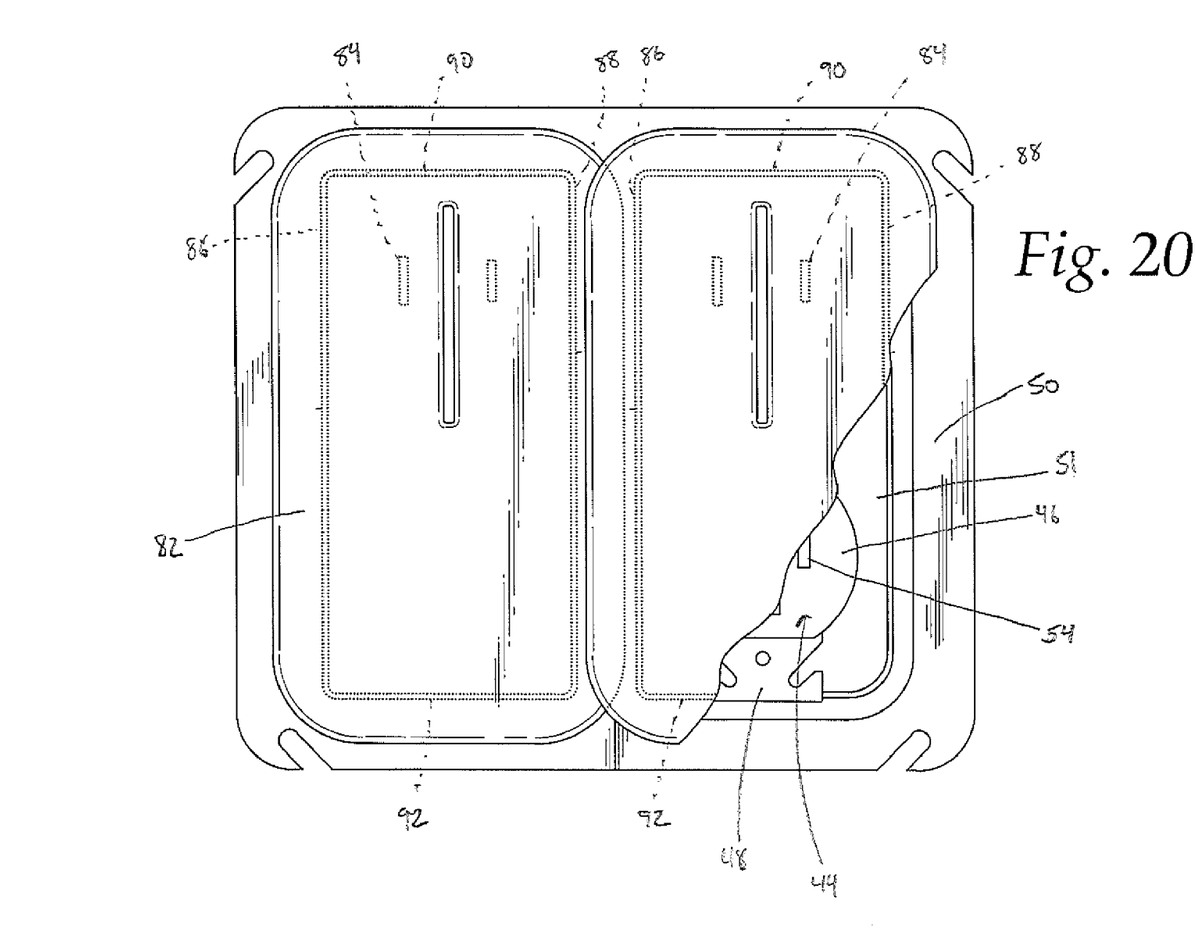
FIG. 20 is a perspective view of covers (with a portion of one of the covers broken away) on adjacent outlets with the bands of the shields disposed in overlapping relation to one another.

First and second overspray walls 34 and 36 are formed on the rear face of the plate 12. The walls extend generally normal to the plate 12. By way of example only, the walls may be about 0.150 to 0.220 inches high. This is enough to surround and protect the device without getting in the way. It should also be noted in this regard that the walls 34 and 36 are spaced inwardly from the perimeter 18 of the plate. This leaves a band of plate surface surrounding the walls and to the exterior thereof which is essentially flat. With this construction adjacent shields can overlap one another without the overspray walls interfering (see FIG. 20). The walls 34 and 36 are preferably spaced from one another a distance that allows the walls to releasably engage either the socket housings of an outlet or the frame surrounding the rocker of a decor type switch. For standard outlets and decor switches, this distance is about 1.285 inches. In this instance the overspray walls serve the additional function of an attachment element. The shield 10 can be pressed onto an outlet or decor type switch and the overspray walls will engage the socket housings or frame of the rocker, as will be described below. The overspray walls 34 and 36 are preferably parallel to one another. There may also be top and bottom overspray walls 38 and 40. In shields with blisters 20, 22 there is a hiatus 42 in the top and bottom overspray walls to allow for the switch frame.

Figure 13:
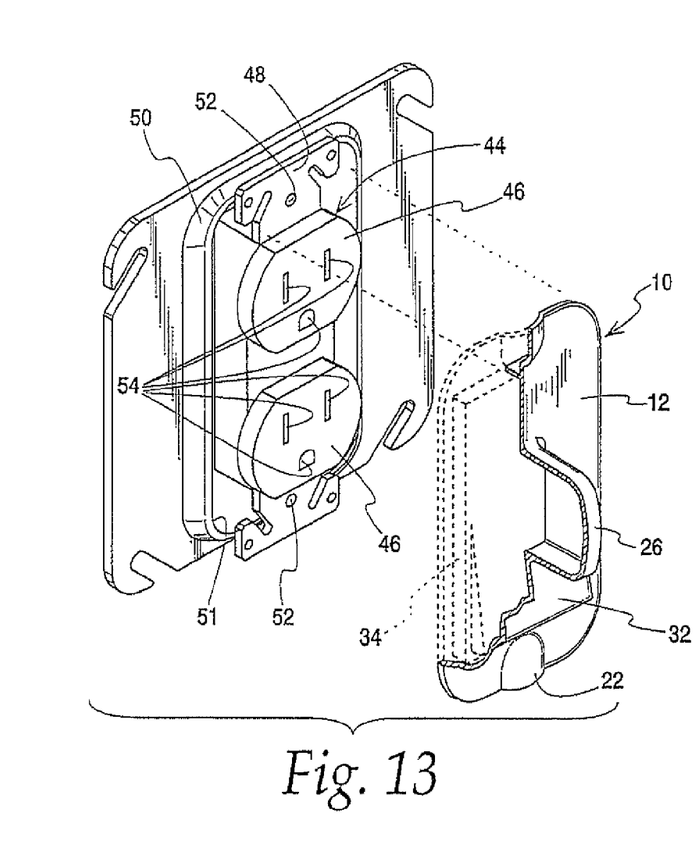
FIG. 13 is an exploded perspective view of the universal cover on an outlet, with portions of the cover broken away and in section.
Figure 14:
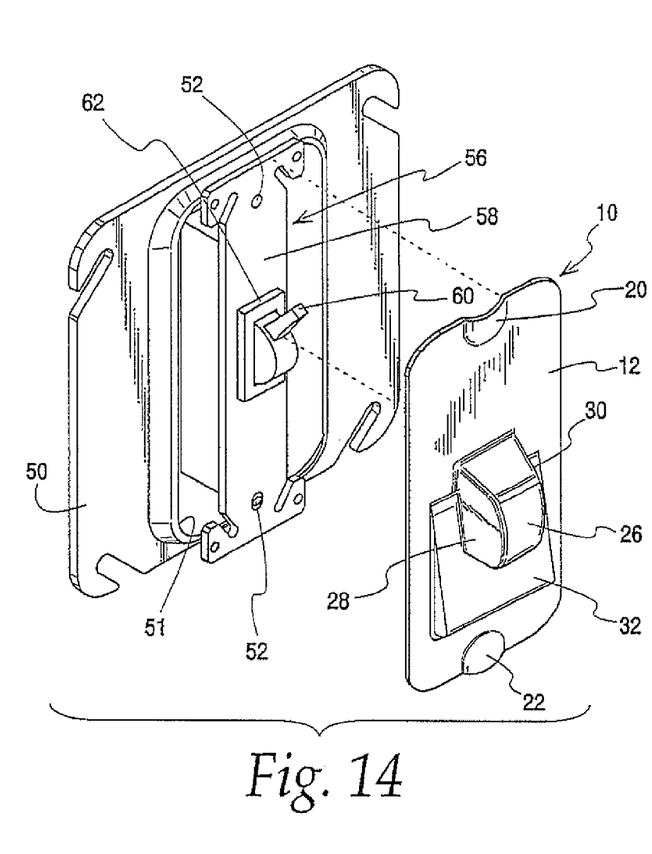
FIG. 14 is an exploded perspective view of the universal cover on a standard wall switch.
Figure 15:
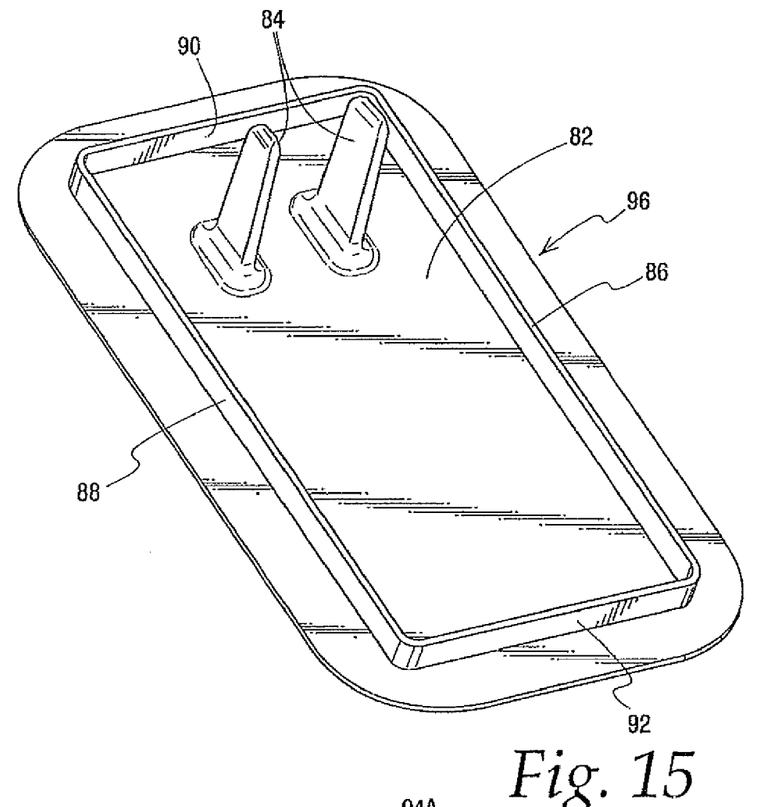
FIG. 15 is a perspective view of a further embodiment of an outlet cover, generally showing the rear side of the cover.
Figure 16:
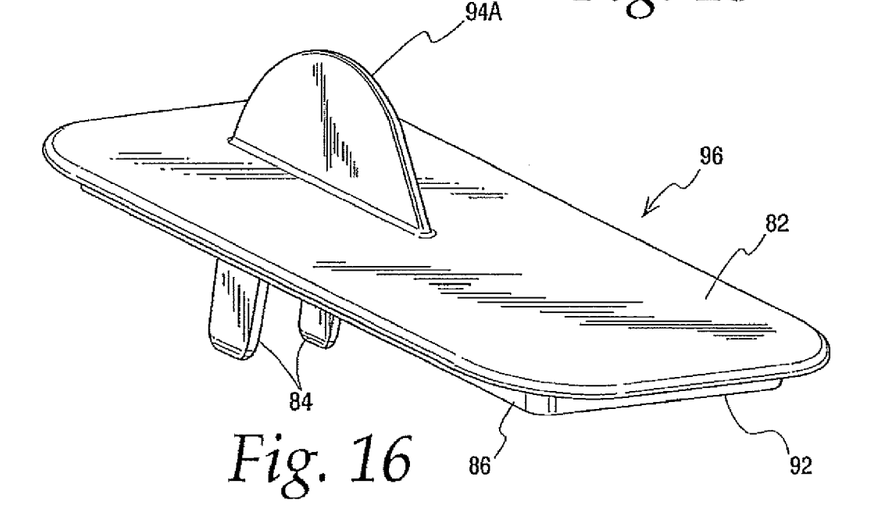
FIG. 16 is a perspective view of the cover of FIG. 15, generally showing the front side of the cover.
Figure 17:
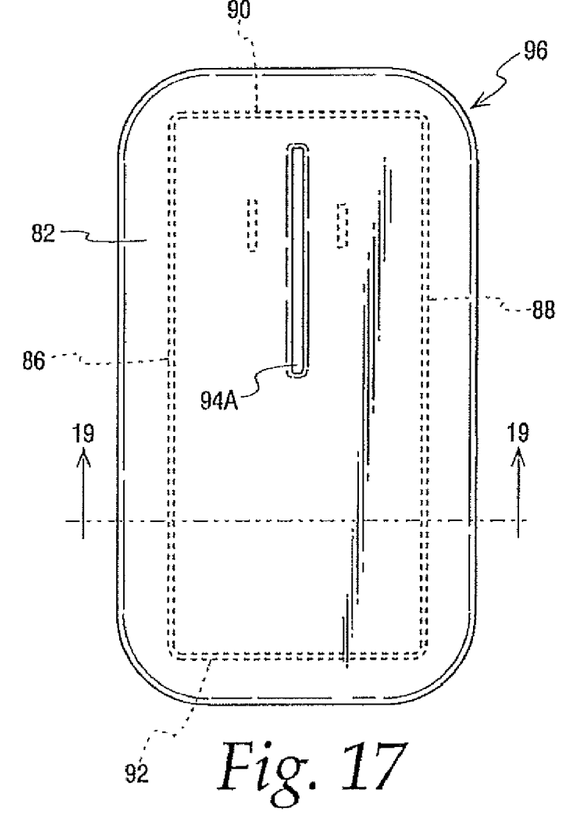
FIG. 17 is a front elevation view of the outlet cover of FIGS. 15 and 16.
Figure 18:
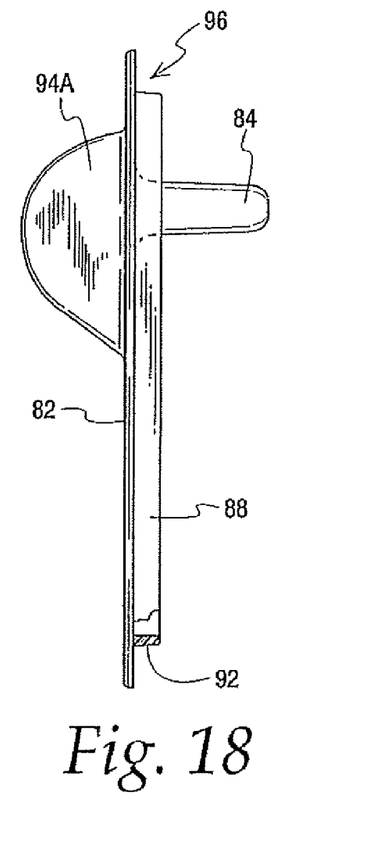
FIG. 18 is a side elevation view of the outlet cover of FIG. 17, with portions broken away and in section.
Figure 19:
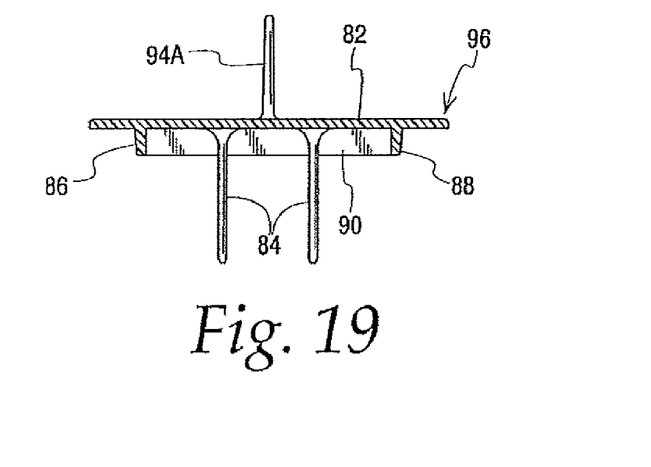
FIG. 19 is a section taken along 19-19 of FIG. 17.

FIGS. 13 and 14 illustrate two of the three types of electrical devices on which the shield 10 can be used. The device in FIG. 13 is an outlet 44. The outlet has a pair of socket housings 46 attached by a bracket 48 to a junction box 50. The junction box includes an opening 51 into which the outlet 44 fits. The bracket 48 has screw holes 52 that receive screws (not shown) for attachment of the bracket to the junction box. There is a second set of screw holes (not shown) for mounting the face plate or decorative plate to the bracket 48. The socket housings 46 have the usual apertures 54 for the blades and ground of an electrical plug. FIG. 14 shows an electrical device in the form of a standard wall switch 56. The switch includes a bracket 58 for attaching the switch to a junction box 50. Screw holes 52 are located in the bracket 58. The switch 56 has an actuating lever in the form of a toggle 60. The toggle is surrounded by a frame 62. It will be understood while that the toggle moves back and forth as a user turns the switch on and off, the frame 62 remains stationary. A decor type switch, while not shown, is similar to the wall switch except that the lever has the form of a rocker that is wider and flatter than the toggle 60. There is a similar stationary frame around the rocker of the decor type switch.

The use, operation and function of the shield 10 are as follows. The shield is applied to an outlet 44 as shown in FIGS. 3 and 13. The overspray walls 34, 36 are spaced apart a distance about equal to the width of the socket housings 46. Thus, when a user pushes the shield onto the outlet there is a press fit of the overspray walls on the outer edges of the socket housings. This retains the shield on the outlet. The plate 12, the dome 26, the well 32 and the overspray walls 34, 36, 38, 40 protect the outlet 44 from contact with paint or other surface finishes. The blisters 20, 22 accommodate any screw heads protruding from screw holes 52. FIG. 14 indicates how the shield is used on a switch. In either a standard wall switch or a decor type switch there is a press fit between the switch frame 62 and attachment elements of the shield. In the case of the standard wall switch the attachment elements are the side walls 28, 30 of the dome 26. The side walls fit snugly over the frame 62 to hold the shield on the switch. Note that the dome does not intentionally engage the toggle 60. The toggle is received in the chamber defined by the dome but is not intended to contact the dome; any such contact is incidental. In the case of a decor type switch the attachment elements are the overspray walls 34, 36 which fit snugly on the frame around the rocker. The protruding half of the rocker resides in the well 32 when the shield is applied to a decor type switch. Again any contact between the well and the rocker is incidental. With any of the devices removal of the shield after use is most readily accomplished by grasping the dome 26 and simply pulling the shield off the device.

An alternate embodiment of the shield is shown at 64 in FIGS. 6-9. Shield 64 is similar in some respects to the universal shield 10. Shield 64 has a generally planar plate 66 with first and second blisters 68 and a central opening 70 surrounded by a dome 72. First and second overspray walls 74, 76 are formed on the rear face of the plate. The overspray walls join end walls 75 and 77. The end walls have a central hiatus to accommodate the switch bracket. The opening 70 is wider than that of the universal shield, so the dome walls do not engage the switch frame. Instead, the attachment elements comprise a pair of pins 78. These pins are sized and spaced to fit into the face plate mounting screw holes in the bracket 58 of a standard wall switch. As such the pins will not fit the screw holes of a decor type switch or an outlet. Thus, this embodiment will work only with a standard wall switch. The advantage of shield 64 is the pins 78 provide a stronger holding force that may be appropriate for specialized applications. Such applications may include manufactured housing and the like where there may be a significant time delay between application of a shield and surface treatment of a wall. For example, the shield may be installed at the factory and then the unit is transported to its ultimate site where a purchaser chooses a color scheme and then the paint is applied. The shield may be subject to higher and/or more frequent loads in such an instance and the pins 78 are built to handle such loads.

Figure 10:
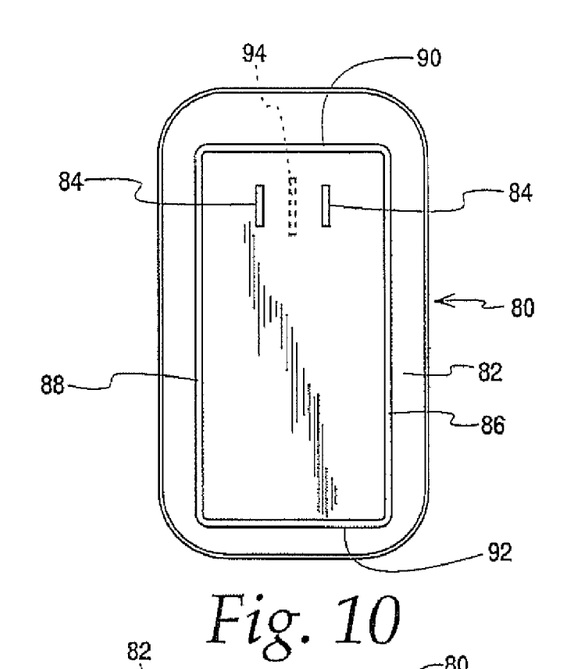
FIG. 10 is a rear elevation view of an alternate embodiment of a paint shield, in the form of an outlet cover.
Figure 11:
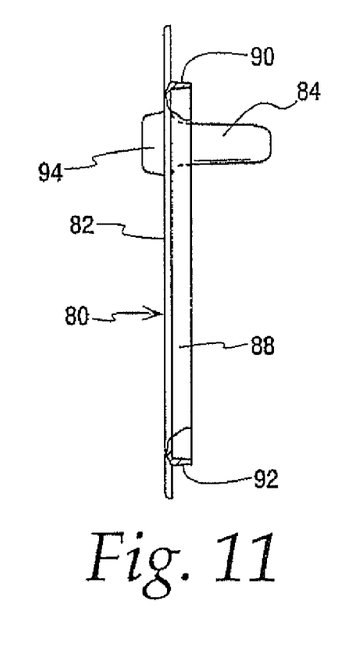
FIG. 11 is a side elevation view of the outlet cover of FIG. 10, with the end overspray walls shown in section.
Figure 12:
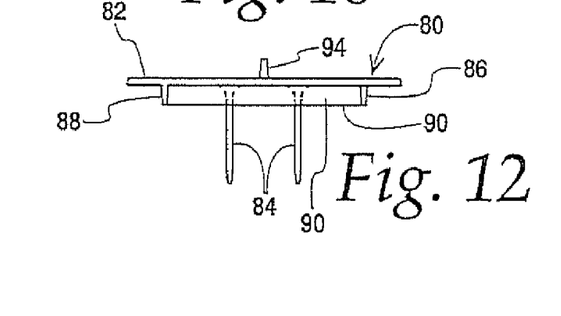
FIG. 12 is a end elevation view of the outlet cover.

A version of the high holding force shield 64 that only fits standard wall switches can be made as well. Such an embodiment is shown in FIGS. 10-12. Shield 80 has a planar plate 82. Attachment elements in the form of a pair of blades 84 extend from the rear face of the plate. The blades are insertable into the apertures 54 of an outlet. First and second overspray walls 86, 88 also extend from the rear face of the plate. These are joined by end walls 90, 92 which in this case are uninterrupted. Thus, the overspray walls form a completely enclosed rectangle in this embodiment. The front face of the shield carries a tab 94 that facilitates removal of the shield from an outlet. The tab can be grasped, most conveniently with a pliers, allowing the user to pull the blades 84 out of the outlet.

The tab could be longer than that shown to make it even easier to grasp. Such an embodiment is shown generally at 96 in FIGS. 15-19. This embodiment is generally similar to that of FIGS. 10-12 so similar parts will be given the same reference numerals. Shield 96 has a planar plate 82. Attachment elements in the form of a pair of blades 84 extend from the rear face of the plate. The blades are insertable into the apertures 54 of an outlet. First and second overspray walls 86, 88 also extend from the rear face of the plate. These are joined by end walls 90, 92 which in this case are uninterrupted. Thus, the overspray walls form a completely enclosed rectangle in this embodiment. The front face of the shield carries a tab 94A that facilitates removal of the shield from an outlet. The tab is readily grasped by a user, allowing the user to pull the blades 84 out of the outlet.

While the preferred form of the invention has been shown and described herein, it should be realized that there may be many modifications, substitutions and alterations thereto. For example, while the universal cover has an upraised well for accommodating a decor switch rocker, the well could be deleted and the rocker accommodated by elongating the overspray walls. Also, the switch cover of FIGS. 6-9 could be adapted for use on a decor type switch. It should also be noted that the universal cover will work with an alternate form of electrical outlet. In some outlets instead of having the two separate, somewhat oval-shaped socket housings 46 as shown in FIG. 13, there is a continuous, generally rectangular housing that integrally incorporates two sets of apertures 54. The width of this housing is substantially the same as the width of the socket housings in the conventional outlet. Thus, the overspray walls will engage either type of housing in a press fit.

I claim:

1. A paint shield for attachment to an electrical device, comprising:
    a generally planar plate defining a front face, a rear face and a perimeter;
    at least one attachment element connected to the plate and releasably engageable with the device; and
    at least one overspray wall attached to the rear face of the plate, spaced from the perimeter of the plate and extending out of the plane of the plate.

2. The paint shield of claim 1 wherein the attachment element comprises at least one pin extending from the rear face of the plate.

3. The paint shield of claim 2 further comprising a central opening in the plate and a dome surrounding the central opening and protruding from the front face to define a toggle receiving chamber.

4. The paint shield of claim 3 further comprising at least one blister formed in the plate and forming a concave screw head receiving receptacle on the rear face of the plate.

5. The paint shield of claim 1 wherein the attachment element comprises at least one blade extending from the rear face of the plate.

6. The paint shield of claim 5 wherein the overspray wall forms a rectangular enclosure surrounding the blade.

7. The paint shield of claim 1 wherein the plate has a central opening therein and the attachment element comprises a dome surrounding the central opening and protruding from the front face to define a toggle receiving chamber, the dome being sized so as to be releasably engageable with the frame surrounding the toggle of a standard wall type switch.

8. The paint shield of claim 7 further comprising at least one blister formed in the plate and forming a concave screw head receiving receptacle on the rear face of the plate.

9. A paint shield for attachment to one of an electrical outlet having at least one socket housing or an electrical switch of either the standard wall type having a lever in the form of a toggle or the decor type having a lever in the form of a rocker, each lever being surrounded by a frame, the paint shield comprising:
    a plate member defining a front face, a rear face, a central opening and a perimeter;
    a dome surrounding the central opening and protruding from the front face to define a toggle receiving chamber, the dome being sized so as to be releasably engageable with the frame of a standard wall type switch;
    first and second overspray walls attached to the rear face of the plate, the first and second overspray walls being parallel to one another on opposite sides of the dome and spaced apart a distance that enables the overspray walls to be releasably engageable with either the socket housing of an outlet or the frame of a decor type switch.

10. The paint cover of claim 9 further comprising an upraised well formed in the plate member to define a rocker receiving chamber.

11. The paint cover of claim 9 further comprising at least one blister formed in the plate member to define a screw head receiving receptacle.

12. A paint shield for attachment to an electrical switch of either the standard wall type having a lever in the form of a toggle or the decor type having a lever in the form of a rocker, each lever being surrounded by a frame, the paint shield comprising:

a plate member defining a front face, a rear face, a central opening and a perimeter;

a dome surrounding the central opening and protruding from the front face to define a toggle receiving chamber, the dome being sized so as to be releasably engageable with the frame of a standard wall type switch; and first and second overspray walls attached to the rear face of the plate, the first and second overspray walls being parallel to one another and spaced apart a distance that enables the overspray walls to be releasably engageable with the frame of a decor type switch.

13. A paint shield for attachment to an electrical device, comprising:

a generally planar plate defining a front face, a rear face and a perimeter;

at least one blister formed in the plate and forming a concave screw head receiving receptacle on the rear face of the plate;

an overspray wall attached to the rear face of the plate, spaced from the perimeter of the plate and extending out of the plane of the plate; and at least one attachment element connected to the plate and releasably engageable with the device.

14. A kit for protecting first and second adjacent electrical devices during finishing operations, the kit comprising first and second paint shields, each paint shield having a generally planar plate defining a front face, a rear face and a perimeter, at least one attachment element connected to the plate and releasably engageable with a device, and at least one overspray wall attached to the rear face of the plate and extending out of the plane of the plate, the overspray wall being spaced from the perimeter of the plate to define a band of plate surface to the exterior of the wall, the bands of the first and second paint shields mounted on adjacent electrical devices being disposed in overlapping relation to one another without interfering with each other.

* * * * *